E. WILLIAMS.
CONTROLLING MECHANISM.
APPLICATION FILED OCT. 24, 1919.

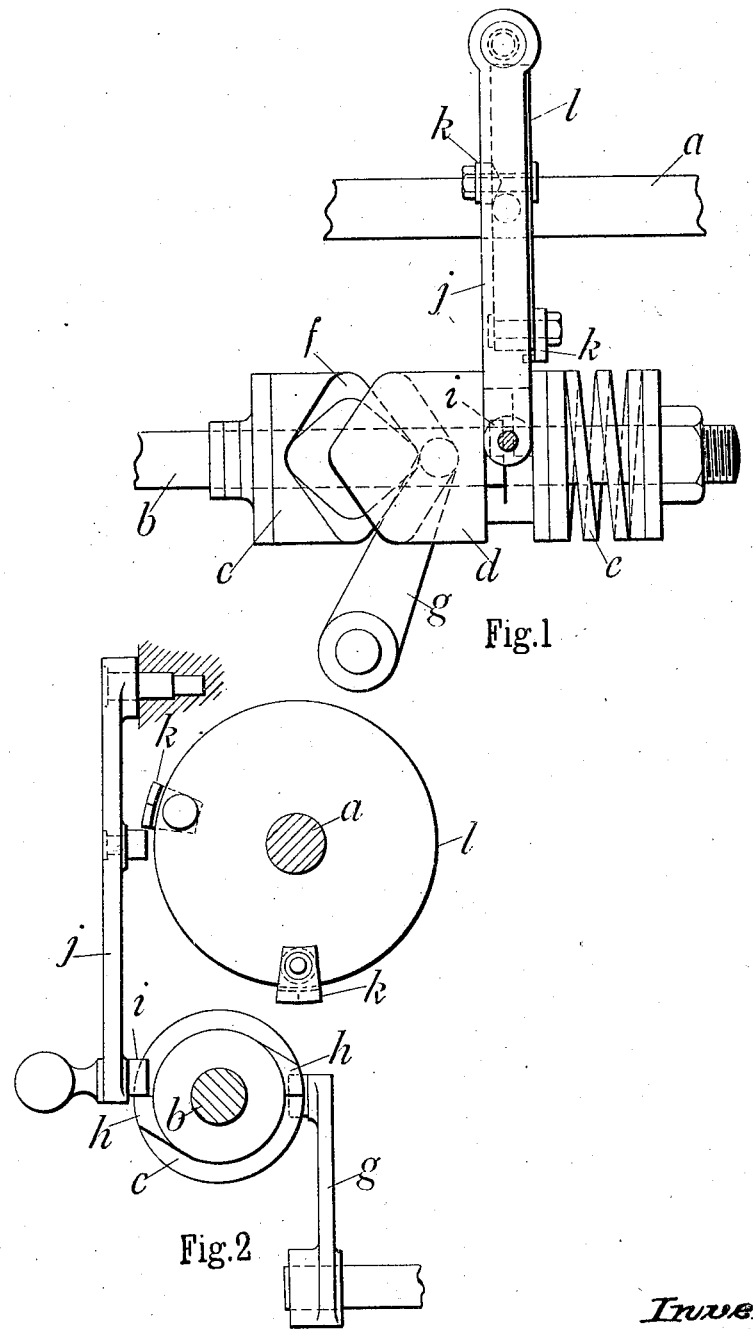

1,353,368.

Patented Sept. 21, 1920.
2 SHEETS—SHEET 2.

Inventor
E. Williams,
By H. R. Kerslake
Attorney

UNITED STATES PATENT OFFICE.

EDWARD WILLIAMS, OF BIRMINGHAM, ENGLAND.

CONTROLLING MECHANISM.

1,353,368.    Specification of Letters Patent.    Patented Sept. 21, 1920.

Application filed October 24, 1919. Serial No. 333,098.

*To all whom it may concern:*

Be it known that I, EDWARD WILLIAMS, a subject of the King of Great Britain and Ireland, residing at 17 Sandon road, Edgbaston, in the city of Birmingham, England, have invented certain new and useful Improvements Relating to Controlling Mechanisms, of which the following is a specification.

This invention has for its object to provide improved mechanical relays or controlling mechanisms.

The invention comprises the use for actuating an operator, of a mechanically driven clutch the parts of which are in constant operative connection, and the movement of one of which is controlled through the medium of stops automatically or by hand. In particular the invention comprises the use of a friction clutch one part of which is connected to a driving shaft and the other to an operator, the latter part being controlled by stops which are released or engaged by manually or mechanically actuated mechanism.

Referring to the two accompanying sheets of explanatory diagrams:—

Figure 1 is a front elevation, and Fig. 2 an end elevation partly in section of a mechanical relay or controlling mechanism constructed in accordance with this invention.

Referring to Figs. 1 and 2, the arrangement shown comprises a shaft $a$ which rotates slowly and a shaft $b$ which rotates quickly. The shaft $b$ is fitted with a friction clutch. One member $c$ of the clutch is fixed to the shaft while the other $d$ which is free on the shaft is held constantly in frictional contact with the fixed clutch member by a spring $e$. With the free clutch member is formed or secured a cam $f$ which through the medium of an operator in the form of a lever $g$ can impart motion from the cam to any mechanism which it is required to actuate. With the same member is also arranged a pair of stops $h$. Either of these stops can be engaged by a projection $i$ on a control lever $j$ which is actuated by striking pieces $k$ on a disk $l$ secured to the slow running shaft. The stops $h$ are not in the same plane but are arranged in a staggered relationship. Alternatively a lever with staggered projections may be arranged with the member $d$, and one or more stops provided on the said member.

The fixed clutch member $c$ tends constantly to rotate the free member $d$ but the latter is prevented from rotation by the engagement of one of its stops with the projection on the control lever. When the latter is actuated by a striking piece on the disk of the slow running shaft it gradually slides the projection $i$ away from the stop $h$ and eventually moves it into a free position. At this instant the free clutch member is quickly rotated by the fixed clutch member and during its rotation the cam performs the required movement of the operator $g$. At the completion of this movement the other stop engages the control lever projection and the motion of the free clutch member is arrested.

From the foregoing it will be seen that while the motion of the control lever may be slow the motion of the operator is performed rapidly. Moreover the mechanism employed is of simple construction, is reliable in action and does not depend for its working upon fine adjustments. Instead of the control lever being actuated automatically it may be operated by hand.

Figures 3, 4:
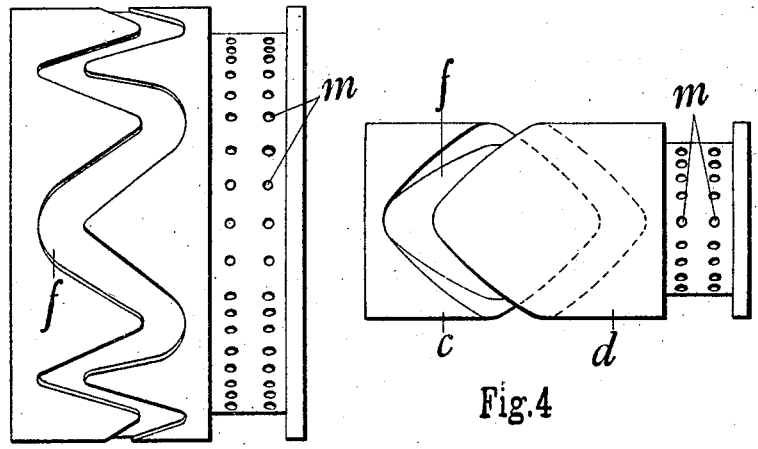
Figs. 3, 4 and 5 illustrate alternative forms of driven cams and stop devices.
Figure 5:
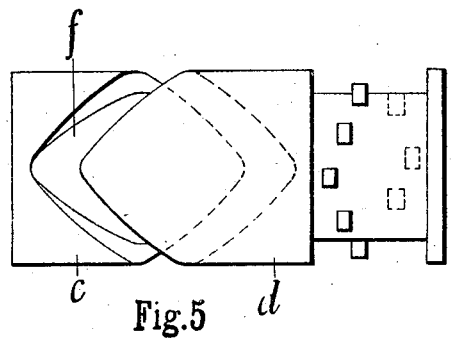
Figures 6, 7:
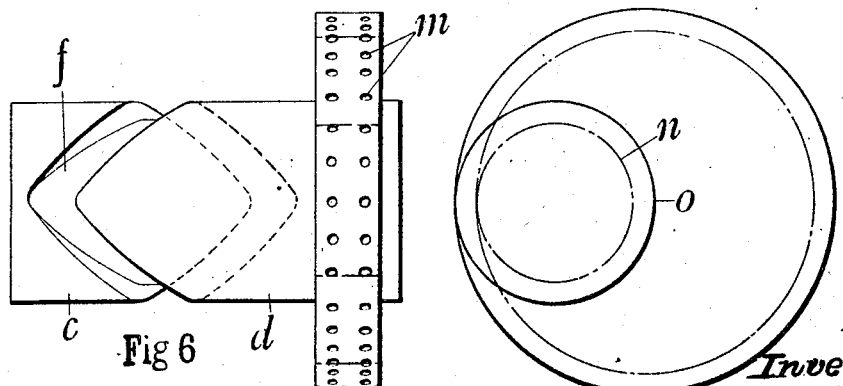
Figs. 6 and 7 show a cam in conjunction with a stop ring to which it is connected through reduction gearing.

The cam $f$ above described may be adapted to produce one complete oscillation of the operator in each revolution, or it may be shaped to produce any desired number of oscillations. An example of such a cam is shown in Fig. 3. In conjunction with the cam any desired number of stops may be arranged and the disposition of these may be varied in a number of ways. For example as shown in Figs. 3 and 4 one convenient arrangement of stops consists of a number of pegs inserted in any of a number of holes $m$ situated around the circumference of the part to which the stops are attached. When it is desired to provide a large number of stops, then to avoid undue crowding, the stops may be arranged as shown in Figs. 6 and 7 around a drum of relatively large diameter which is driven by an internally or externally toothed wheel gearing $n$ with a wheel $o$ secured to the cam. For some purposes a plurality of stops are disposed spirally on the cam as shown in Fig. 5, and the striking pieces which actuate the control lever are adapted to impart to the said lever lateral movements of different amounts. A movement of the control lever sufficient to carry its projection from one stop to the next results in an angular movement of the cam equal to the distance between those stops. A larger movement of the control lever carries its projection into alinement with another stop and a correspondingly larger movement is given to the cam.

Instead of transmitting motion from the clutch by a cam and lever, an eccentric and connecting rod, or a Geneva stop or any other motion may be used as the operator.

My improved mechanical relays or controlling mechanisms are applicable to a wide variety of uses. With the controlling lever arranged to be actuated by hand the mechanism may be employed for effecting gear changes on motor vehicles. The particular mechanisms above specified are given only as illustrations.

Having thus described my invention what I claim as new and desire to secure by Letters Patent is:—

1. In a mechanical relay or controlling mechanism, the combination comprising an operator, a clutch driving shaft, a two-part friction clutch one part of which is connected to the driving shaft, a cam on the other clutch part for actuating the operator a stop in conjunction with the second named clutch part, and a lever for arresting and releasing the stop, substantially as described.

2. In a mechanical relay or controlling mechanism, the combination comprising an operator, a clutch driving shaft, a two-part friction clutch one part of which is connected to the driving shaft, the other part being adapted to actuate the operator, a stop in conjunction with the second named clutch part, a lever for arresting and releasing the stops, a striking piece for actuating the lever, and a shaft for actuating the striking piece, substantially as described.

3. In a mechanical relay or controlling mechanism, the combination comprising an operator lever, a clutch driving shaft, a two-part friction clutch one part of which is connected to the shaft, a cam on the other part for actuating the operator lever, a spring holding the clutch parts in constant operative connection, a plurality of stops in conjunction with the second named clutch part, a controlling lever for arresting and releasing the stops, a plurality of striking pieces for actuating the controlling lever, a disk carrying the striking pieces, and a shaft rotating the disk, substantially as described.

In testimony whereof I have signed my name to this specification.

EDWARD WILLIAMS.